United States Patent
Chang (10) Patent No.: US 8,998,223 B2
(45) Date of Patent: Apr. 7, 2015

(54) BRAKING SYSTEM, ROLLATOR AND TRANSPORT CHAIR WITH THE SAME

(71) Applicant: Flying Eagle Technology Inc., Taipei (TW)

(72) Inventor: Ling-Seng Chang, Taipei (TW)

(73) Assignee: Flying Eagle Technology Inc., Taipei (TW)

( * ) Notice: Subject to any disclaimer, the term of this patent is extended or adjusted under 35 U.S.C. 154(b) by 49 days.

(21) Appl. No.: 13/832,696

(22) Filed: Mar. 15, 2013

(65) Prior Publication Data
US 2014/0265188 A1 Sep. 18, 2014

(51) Int. Cl.
| | |
|---|---|
| *F16D 59/02* | (2006.01) |
| *A61G 5/10* | (2006.01) |
| *A61H 3/04* | (2006.01) |
| *B60T 1/04* | (2006.01) |
| *B60T 7/08* | (2006.01) |
| *B60T 7/10* | (2006.01) |
| *B60T 11/04* | (2006.01) |
| *F16D 49/00* | (2006.01) |
| *F16D 69/00* | (2006.01) |
| *F16D 125/60* | (2012.01) |

(52) U.S. Cl.
CPC .............. *F16D 59/02* (2013.01); *A61G 5/101* (2013.01); *A61H 3/04* (2013.01); *B60T 1/04* (2013.01); *B60T 7/08* (2013.01); *B60T 7/102* (2013.01); *B60T 7/104* (2013.01); *B60T 11/046* (2013.01); *F16D 49/00* (2013.01); *F16D 2069/004* (2013.01); *F16D 2125/60* (2013.01)

(58) Field of Classification Search
USPC ............................ 280/87.021; 188/2 F, 57, 20
See application file for complete search history.

(56) References Cited

U.S. PATENT DOCUMENTS

| | | | | | |
|---|---|---|---|---|---|
| 4,384,713 | A | * | 5/1983 | Deutsch et al. | 482/68 |
| 4,907,794 | A | * | 3/1990 | Rose | 482/68 |
| 5,865,065 | A | * | 2/1999 | Chiu | 74/502.2 |
| 5,878,625 | A | * | 3/1999 | Hu | 74/502.2 |
| 5,927,441 | A | * | 7/1999 | Luo | 188/19 |
| 6,032,765 | A | * | 3/2000 | Hsi-Chia | 188/19 |
| 6,079,290 | A | * | 6/2000 | Li | 74/502.2 |
| 6,099,002 | A | * | 8/2000 | Uchiyama | 280/87.021 |
| 6,212,969 | B1 | * | 4/2001 | Kuo | 74/500.5 |
| 6,318,392 | B1 | * | 11/2001 | Chen | 135/67 |
| 6,338,355 | B1 | * | 1/2002 | Cheng | 135/67 |
| 6,378,663 | B1 | * | 4/2002 | Lee | 188/2 F |
| 6,494,469 | B1 | * | 12/2002 | Hara et al. | 280/87.041 |
| 6,622,587 | B1 | * | 9/2003 | Wu | 74/502.2 |
| 6,755,285 | B1 | * | 6/2004 | Wu | 188/2 D |
| 7,052,030 | B2 | * | 5/2006 | Serhan | 280/304.1 |

(Continued)

*Primary Examiner* — Jeffrey J Restifo
(74) *Attorney, Agent, or Firm* — patenttm.us (57) ABSTRACT

A braking system is mounted on a rollator or a transport chair and includes a braking part and an operating system. The braking part is mounted adjacent to a wheel of a rollator or a transport chair. When the operating system is unactuated, the braking part abuts a corresponding wheel to avoid a rotation of the corresponding wheel. When a user wants to walk and move the rollator or the transport chair, the user can press the operating system such that the braking part departs from the wheels and releases a brake. When the user wants to sit on the seat cushion and rest, the user can keep the braking system actuated without pressing the operating system, and accordingly the rollator or the transport chair would not be slidable when sat on, thereby avoiding danger. In addition, when the user walks on a slope, the user can release their hands from the rollator or the transport chair without making the rollator or the transport chair slide down the slope.

12 Claims, 9 Drawing Sheets

(56) References Cited

U.S. PATENT DOCUMENTS

| | | | |
|---|---|---|---|
| 7,219,906 B2 * | 5/2007 | Hallgrimsson et al. | 280/87.041 |
| 7,370,734 B2 * | 5/2008 | Hallgrimsson | 188/31 |
| 7,370,870 B2 * | 5/2008 | Andersson et al. | 280/87.05 |
| 7,410,179 B2 * | 8/2008 | Lonkvist | 280/47.371 |
| 7,540,527 B2 * | 6/2009 | Willis et al. | 280/642 |
| 7,802,659 B2 * | 9/2010 | Huang | 188/19 |
| 7,837,208 B2 * | 11/2010 | Willis | 280/87.021 |
| 8,083,239 B2 * | 12/2011 | Liu | 280/42 |
| 8,251,380 B2 * | 8/2012 | Liu | 280/47.34 |
| 8,267,412 B2 * | 9/2012 | Liu | 280/47.34 |
| 8,313,116 B2 * | 11/2012 | Willis | 280/87.021 |
| 8,439,376 B2 * | 5/2013 | Willis et al. | 280/87.021 |
| 8,448,960 B2 * | 5/2013 | Liu | 280/47.34 |
| 8,454,034 B2 * | 6/2013 | Liu | 280/47.34 |
| 8,505,936 B2 * | 8/2013 | Liu | 280/87.021 |
| 8,517,399 B2 * | 8/2013 | Liu | 280/42 |
| 8,573,613 B2 * | 11/2013 | Liu | 280/87.021 |
| 8,602,424 B2 * | 12/2013 | Liu | 280/42 |
| 8,840,124 B2 * | 9/2014 | Serhan et al. | 280/87.021 |
| 2002/0050427 A1 * | 5/2002 | Lee | 188/2 F |
| 2004/0118640 A1 * | 6/2004 | Hallgrimsson | 188/2 F |
| 2006/0237935 A1 * | 10/2006 | Lonkvist | 280/87.021 |
| 2010/0140893 A1 * | 6/2010 | Menefee | 280/87.041 |
| 2014/0084559 A1 * | 3/2014 | Fang | 280/47.38 |

* cited by examiner

BRAKING SYSTEM, ROLLATOR AND TRANSPORT CHAIR WITH THE SAME

BACKGROUND OF THE INVENTION

1. Field of the Invention

The present invention relates to a braking system, a rollator and a transport chair with the same, and more particularly to a rollator and a transport chair helping an older or a patient to walk.

2. Description of Related Art

A rollator is an auxiliary appliance for users in need of mobility aids to walk and to keep balance.

A conventional rollator has a stand, two handles, four wheels, a seat cushion, a seatback, a braking system and an operating system. The handles are respectively mounted on two sides of the stand and face the same direction. The wheels are mounted rotatably on a bottom of the stand and are arranged in a rectangle. The seat cushion is mounted on the stand and is mounted between the handles and the wheels. The seatback is also mounted on the stand above a side of the seat cushion. The braking system is mounted on the stand and adjacent to one of the wheels. The operating system is mounted on the stand and has an operating part mounted on one of the handles and a brake line connected to the operating part and the braking system.

By pressing the operating part on the handle, the brake line actuates the braking system to brake the wheel so that the conventional rollator is braked. When a user is tired with walking, the user can sit on the seat cushion and lean on the seatback to rest.

However, the conventional rollator has two shortcomings.

First, the braking system relies on manual operation. If the user forgets to press the operating part when sitting on the seat cushion, the conventional rollator is movable and is dangerous for the user sitting on the conventional rollator.

Second, the user has to continuously press the operating part to keep the braking system actuated. If the user unexpectedly needs both hands for grasping something else when walking on a slope, the braking system turns unactuated and the conventional rollator may slide down the slope, causing danger to the user.

SUMMARY OF THE INVENTION

The main objective of the invention is to provide a braking system, a rollator and a transport with the same to overcome the above-mentioned shortcomings.

The braking system comprises a braking part and an operating system; the braking part is mounted adjacent to a wheel of a rollator or a transport chair; the operating system is mounted on a stand of a rollator or a transport chair, the operating system corresponds to and is connected to the braking part; wherein the braking system is mounted on the stand of the rollator or the transport chair; when the operating system is unactuated, the braking part tightly abuts a surface of the corresponding wheel, and when the operating system is actuated, the braking part departs from the surface of the corresponding wheel.

The rollator comprises a stand, two handles, at least three wheels, a seat cushion, at least one braking system and at least one operating system. The handles are respectively mounted on two sides of the stand. The at least three wheels are rotatably mounted on a bottom of the stand. The seat cushion is mounted on the stand between the handle and the wheel. The at least one braking system is mounted on the stand and each one of the at least one braking system corresponds to one of the at least three wheels. The at least one braking system is adjacent to a corresponding wheel and has a braking part mounted on a side of the corresponding wheel. The at least one operating system is mounted on the stand, and each one of at least one operating system is corresponding to and connected to one of the at least one braking system. When the at least one operating system is unactuated, a corresponding braking part tightly abuts a surface of the corresponding wheel; when the at least one operating system is actuated, the corresponding braking part departs from the surface of the corresponding wheel.

The transport chair comprises a stand, two handles, at least three wheels, a seat cushion, a foot support, at least one braking system and at least one operating system; the stand has two opposite sides; the handles are respectively mounted on the two sides of the stand; the at least three wheels are mounted rotatably on a bottom of the stand; the seat cushion is mounted on the stand and mounted between the handles and the wheels; the foot support is mounted on the stand and having a pad mounted on an end of the foot support; the at least one braking system is mounted on the stand, each one of the at least one braking system corresponds to one of the at least three wheels, the at least one braking system is mounted adjacent to a corresponding wheel and has a braking part mounted on a side of the corresponding wheel; the at least one operating system is mounted on the stand, each one of the at least one operating system corresponds to and is connected to one of the at least one braking system; wherein when the at least one operating system is unactuated, the braking part tightly abuts a surface of the corresponding wheel, and when the at least one operating system is actuated, the braking part departs from the surface of the corresponding wheel.

When the operating system is unactuated, the braking system is actuated and the braking part tightly abuts the surface of the corresponding wheel to avoid a rotation of the wheel. When the user wants to walk and move the present invention, the user has to press the operating system to make the braking part depart from the surface of the corresponding wheel to release the brake. When the user wants to rest on the seat cushion, the user can keep the braking system actuated without pressing the operating system, and the rollator would not be moveable and slidable when sat on, thereby avoiding danger. In addition, if the user needs to grasp something else by two hands when walking on a slope, the user can just release the present invention without worrying that sliding of the present invention would cause danger.

DETAILED DESCRIPTION OF THE PREFERRED EMBODIMENTS

Figure 1:
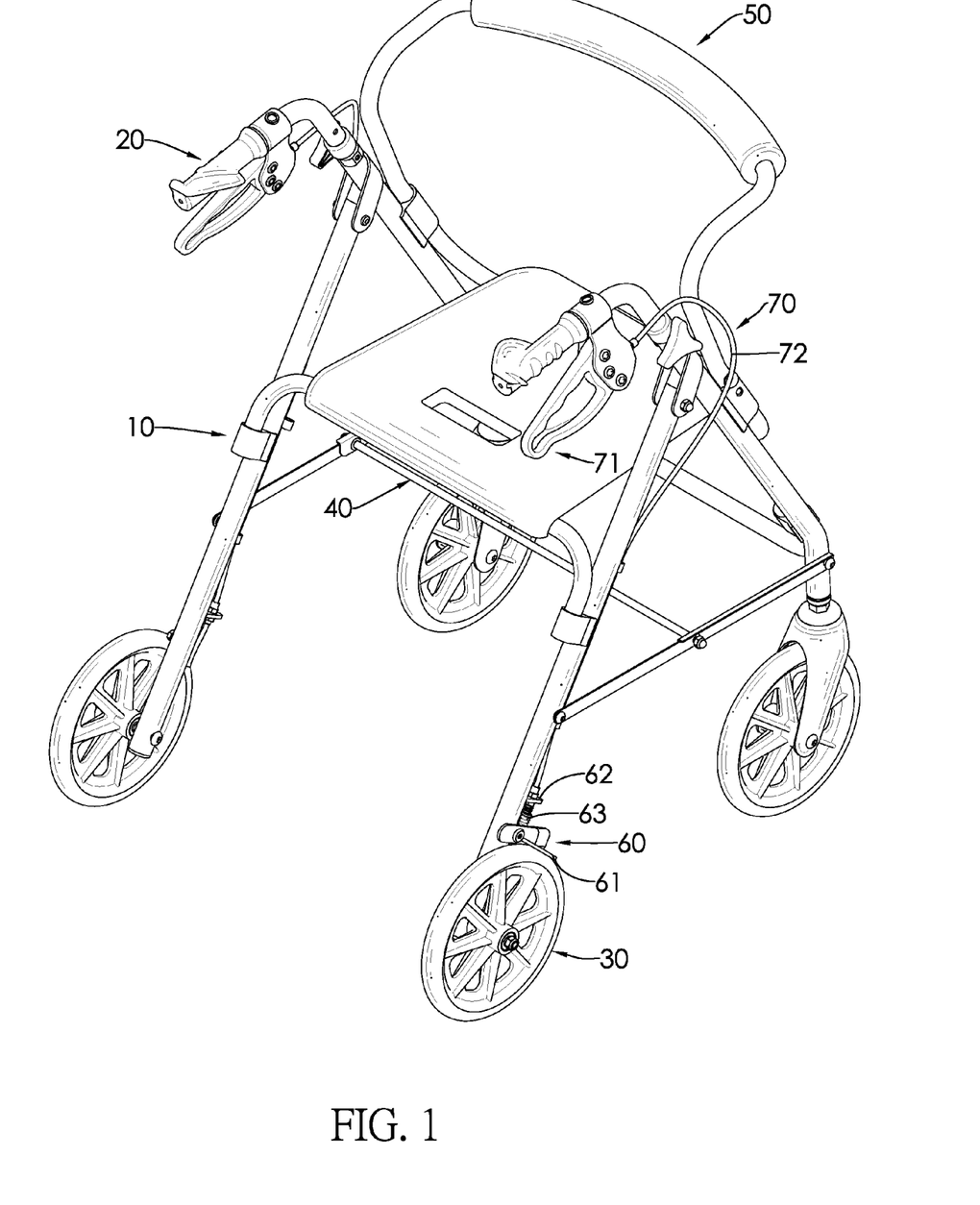
FIG. 1 is a perspective view of a preferred embodiment of a rollator in accordance with the present invention.
Figure 2:
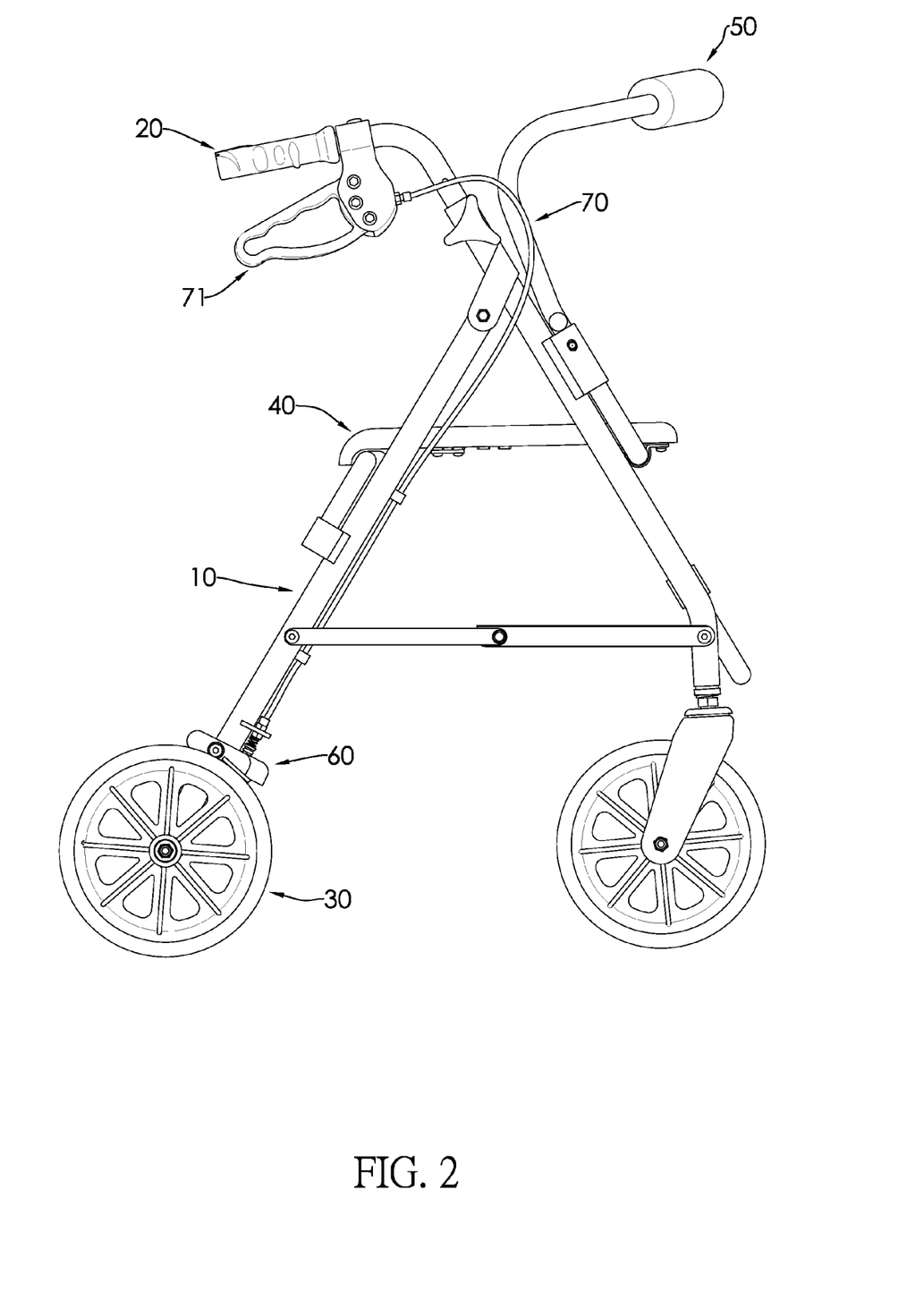
FIG. 2 is a side view of the rollator in FIG. 1.

With reference to FIGS. 1 and 2, a rollator in accordance with the present invention comprises a stand 10, two handles 20, at least three wheels 30, a seat cushion 40, at least one braking system 60 and at least one operating system 70. In a preferred embodiment, the rollator further comprises a seatback 50.

Figure 3:
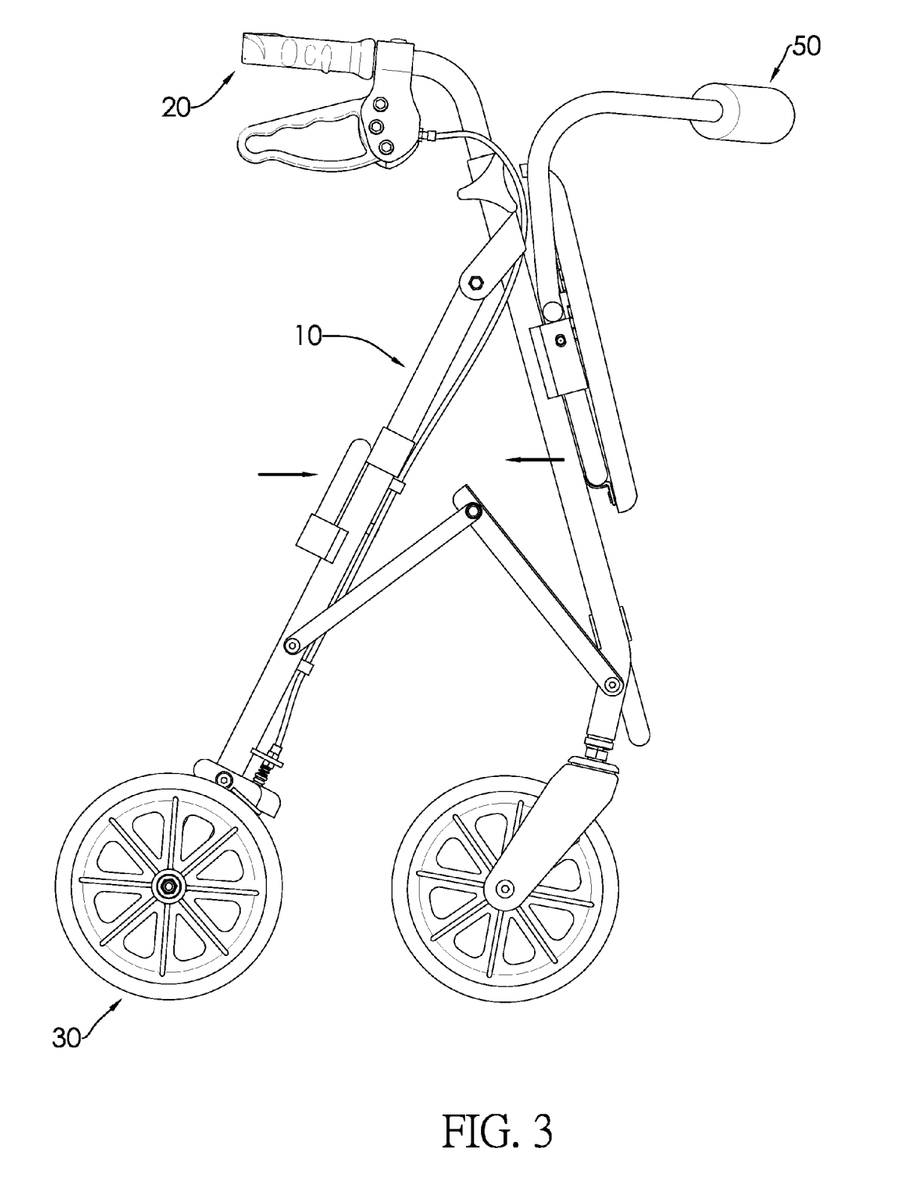
FIG. 3 is an operational side view of the rollator in FIG. 1, shown folded.

With reference to FIGS. 2 and 3, in a preferred embodiment, the stand 10 is foldable and composed of at least two stand bodies pivotally connected to each other. When the rollator is not in use, the rollator can be folded to reduce a storage space.

With reference to FIGS. 1 and 2, the handles 20 are respectively mounted on two top ends on two sides of the stand 10. In a preferred embodiment, the handles 20 both extend to a rear of the stand 10.

In a preferred embodiment, the rollator comprises four wheels 30 arranged in a rectangle and mounted on a bottom of the stand 10, wherein two of the front wheels 30 are mounted on a pivot base. The pivot base is mounted pivotally on a bottom of the stand 10 to make the front wheels 30 on the pivot base pivotable relative to the stand 10.

The seat cushion 40 is mounted on the stand 10 and is mounted between the handles 20 and the wheels 30. In a preferred embodiment, a front side of the seat cushion 40 is pivoted on a side of the stand 10, and a rear side of the seat cushion 40 abuts the other side of the stand 10.

The seatback 50 is mounted on the stand 10 and above a side of the seat cushion 40. In a preferred embodiment, the seatback 50 is a curved rod and is mounted in front of the seat cushion 40.

Figure 4:
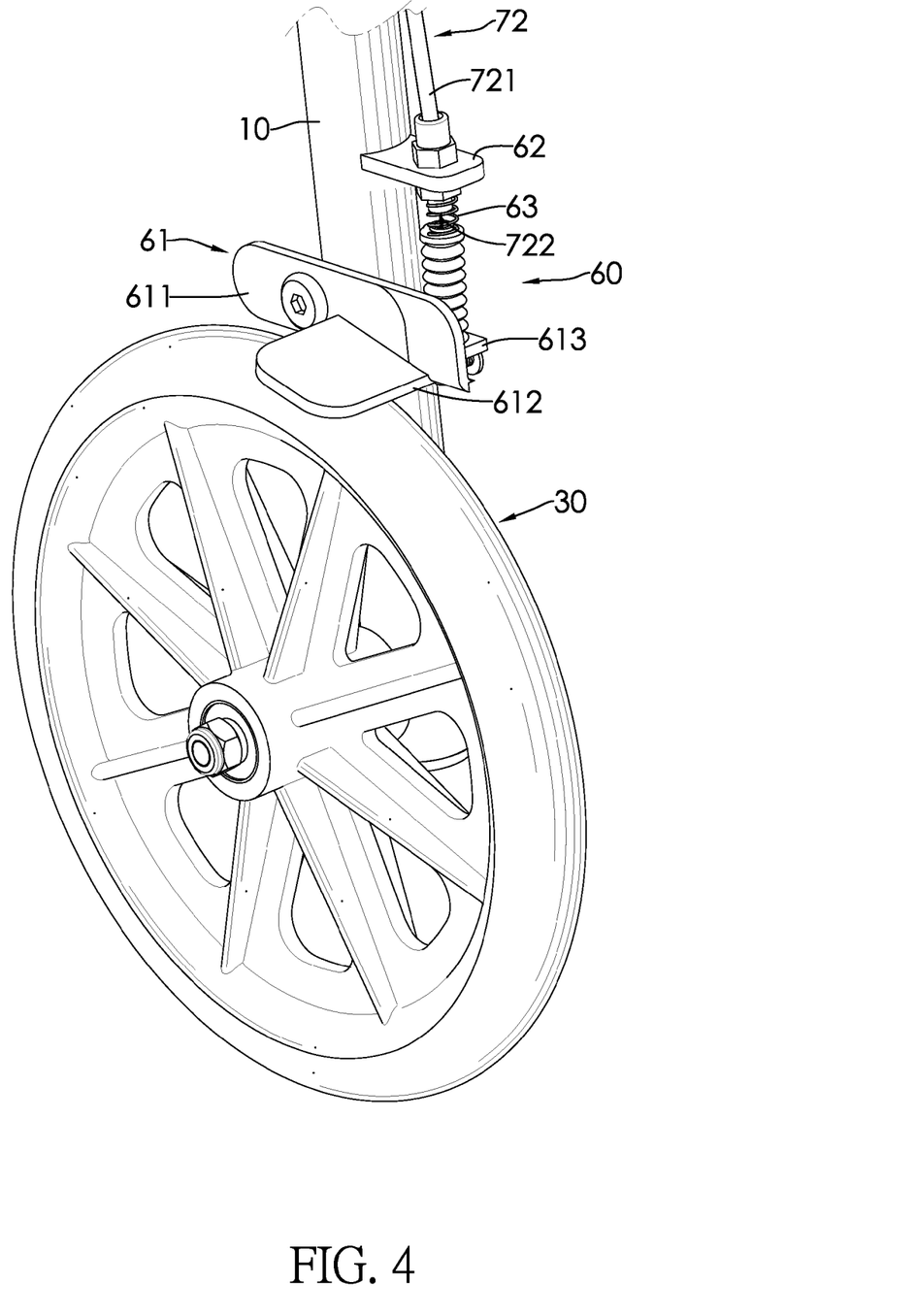
FIG. 4 is an enlarged perspective view of a braking system of the rollator in FIG. 1.
Figure 6:
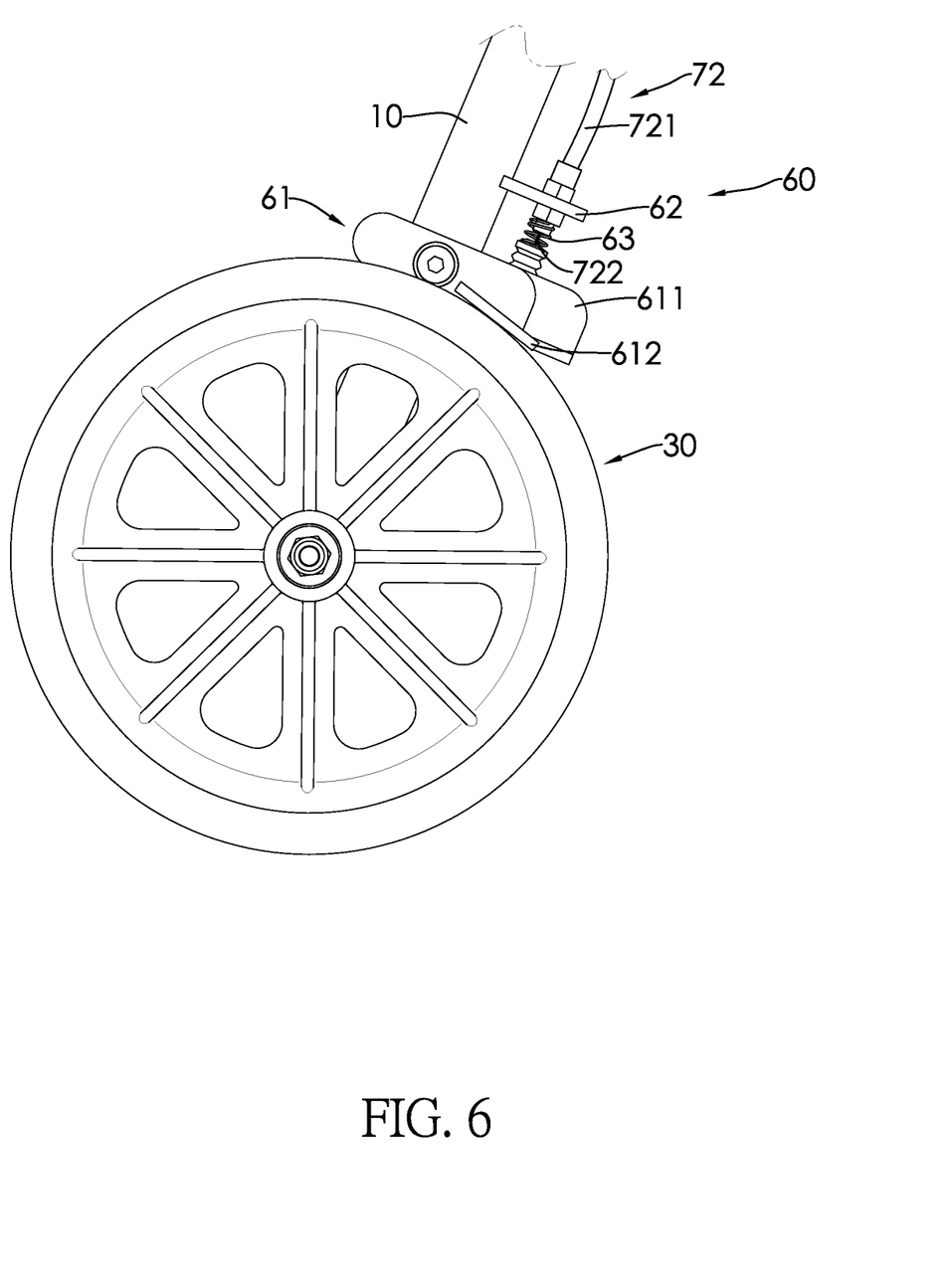
FIG. 6 is an enlarged operational side view of the braking system of the rollator in FIG. 1, shown braked.

With reference to FIGS. 1, 4 and 6, each one of the at least one braking system 60 is mounted on the stand 10 and corresponds to one of the four wheels 30. Each braking system 60 is also mounted adjacent to a corresponding wheel 30. Each braking system 60 has a braking part 61 mounted on a side of the corresponding wheel 30. In a preferred embodiment, the rollator includes two braking systems 60 respectively mounted on tops of the two rear wheels 30. Each of the braking systems 60 further includes a fixed board 62 and an elastic element 63. The fixed board 62 is mounted on the stand 10 above the braking part 61. The braking part 61 has a body 611, an abutting part 612 and a connecting part 613. The body 611 is pivotally mounted on the stand 10, and is a vertical panel. The abutting part 612 and the connecting part 613 respectively connect to two opposite sides of the body 611. The abutting part 612 is an oblique board and abuts the wheel 30. The elastic element 63 is a spring. Two ends of the elastic element 63 respectively abut the fixed board 62 and the connecting part 613 of the braking part 61 to press down the braking part 61 such that the abutting part 612 abuts the wheel 30 as shown in FIG. 6.

Figure 5:
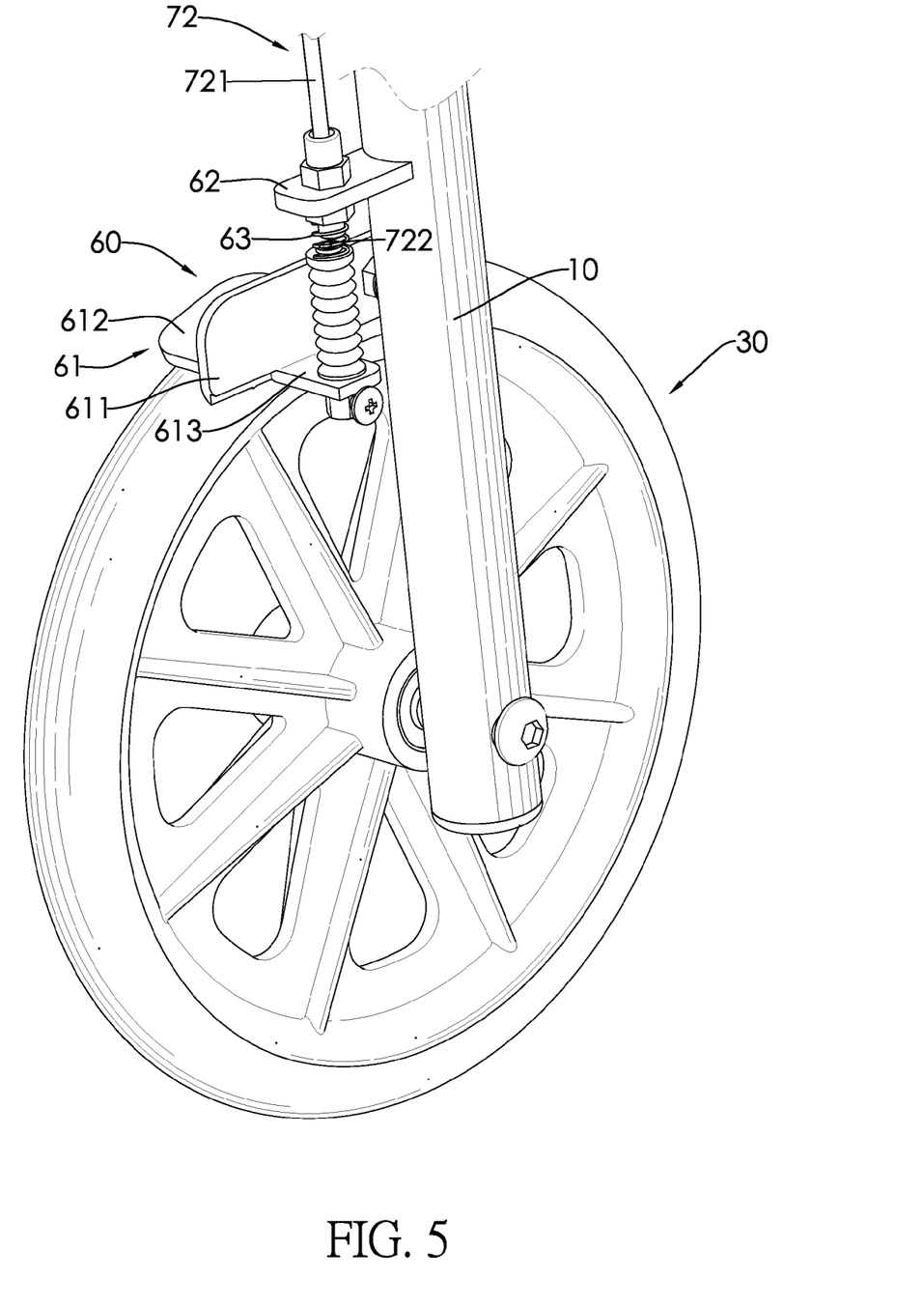
FIG. 5 is another enlarged perspective view of the braking system of the rollator in FIG. 1.

The at least one operating system 70 is mounted on the stand 10 and each one of the at least one operating system 70 corresponds to one of the at least one braking system 60. The at least one operating system 70 also connects to a corresponding braking system 60. In a preferred embodiment, the rollator includes two operating systems 70 respectively connected to the two braking systems 60. Each of the operating systems 70 has an operating part 71 and a brake line 72. The operating part 71 is mounted on one of the two handles 20. The brake line 72 includes a pipe 721 and a line 722. Two ends of the pipe 721 are respectively mounted on the operating part 71 and the fixed board 62 of the corresponding braking system 60. The line 722 extends from the ends of the pipe 721 and ends of the line 722 are respectively mounted on the operating part 71 and the connecting part 613 of the braking part 61 of the corresponding braking system 60.

When a user does not press the operating part 71 of the operating system 70, the operating system 70 is unactuated. The connecting part 613 of the braking part 61 of each of the braking systems 60 is pressed down by the elastic element 63 such that the abutting part 612 of the braking part 61 goes down and tightly abuts the surface of the corresponding wheel 30 as shown in FIG. 6 to brake the rollator of the present invention. Accordingly, the at least one braking system 60 is kept at an actuated status.

Figure 7:
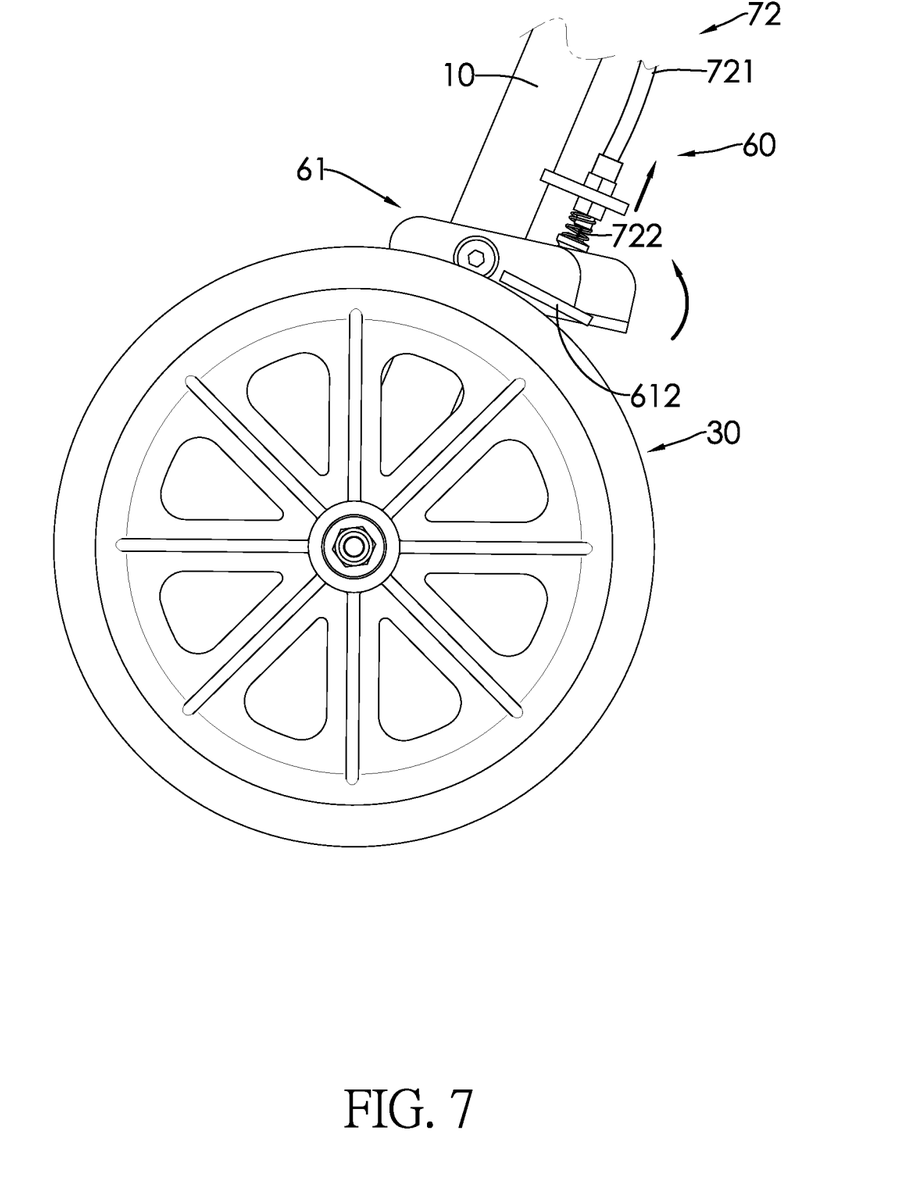
FIG. 7 is another enlarged operational side view of the braking system of the rollator in FIG. 1, shown unbraked.

With reference to FIGS. 1, 5 and 7, when the user intends to walk and move the rollator of the present invention, the user presses the operating part 71 of the operating system 70 to actuate the operating system 70. The operating part 71 pulls up one end of the line 722 of the brake line 72. The other end of the line 722 pulls up the connecting part 613 of the braking part 61. The braking part 61 pivots relative to the stand 10 such that the abutting part 612 of the braking part 61 departs from the surface of the wheel 30 to release a brake of the present invention.

Figure 8:
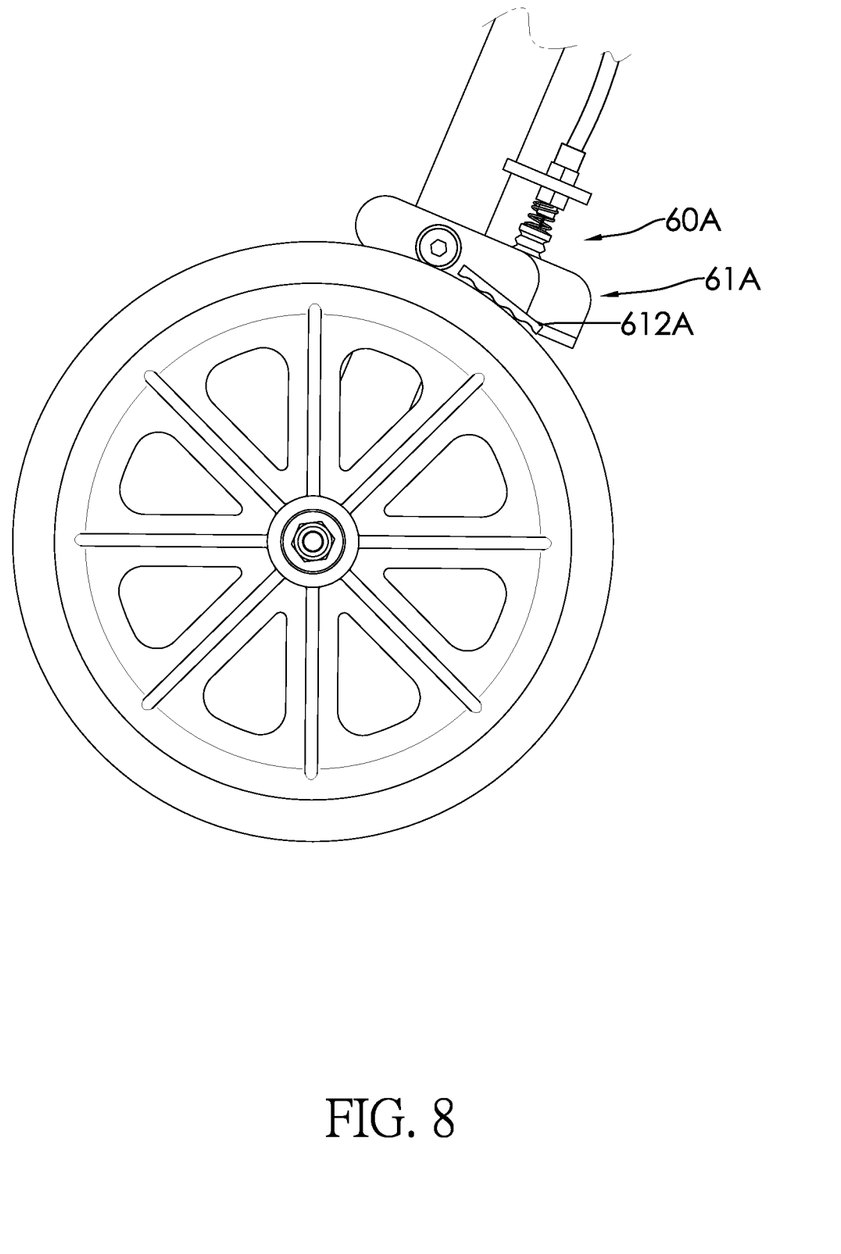
FIG. 8 is an enlarged side view of a braking system of another embodiment of the rollator in accordance with the present invention.

In another preferred embodiment as shown in FIG. 8, a bottom of the abutting part 612A of the braking part 61A of the braking system 60A is wavy. The wavy bottom effectively increases friction to enhance a braking effect.

In still another preferred embodiment, the elastic element 63 of the braking system 60 is a spring plate, or the braking system 60 does not have the elastic element 63 and is directly mounted on the stand 10. The braking system 60 restores to an original position by an elasticity of a material of the braking system 60 to abut the wheel 30.

Figure 9:
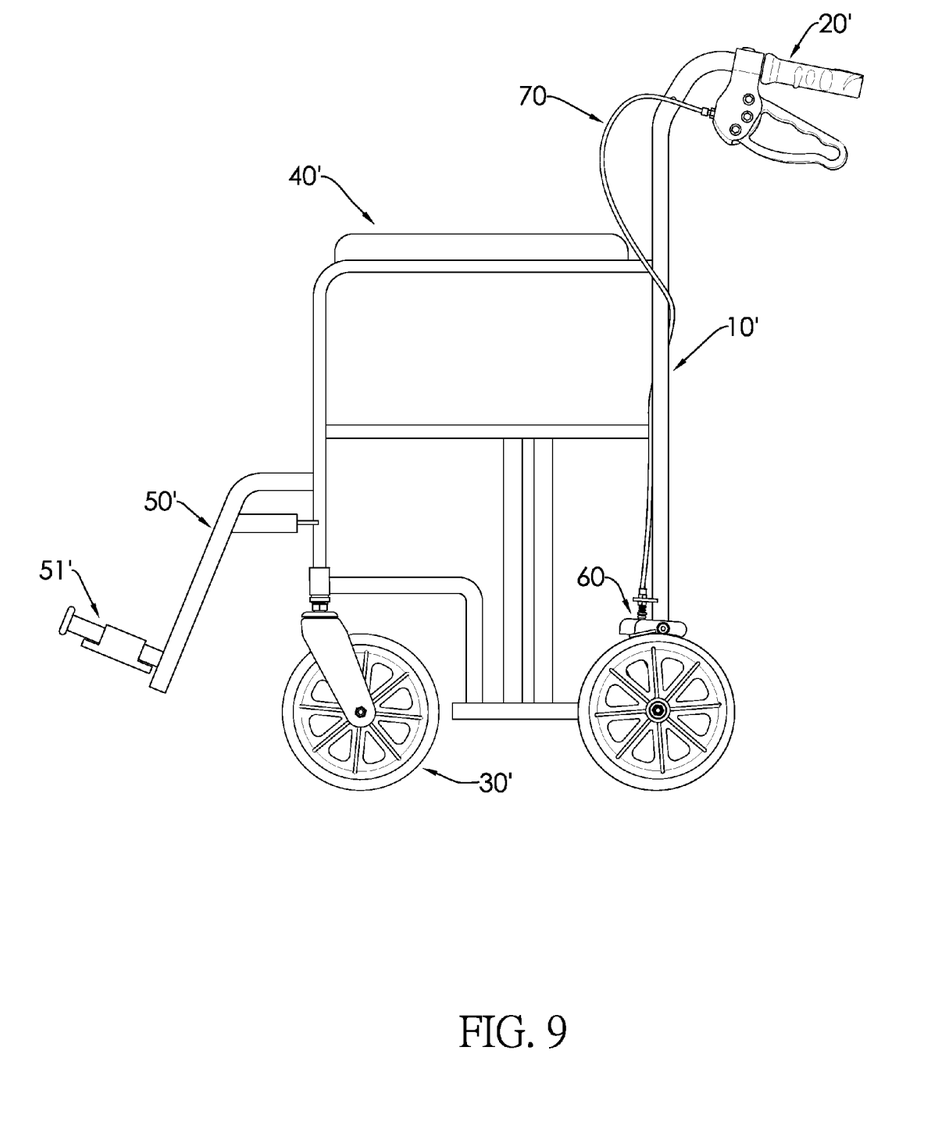
FIG. 9 is a side view of a preferred embodiment of a transport chair in accordance with the present invention.

With reference to FIG. 9, a transport chair in accordance with the present invention comprises a stand 10', two handles 20', four wheels 30', a seat cushion 40', a foot support 50', at least one braking system 60 and at least one operating system 70.

The handles 20' are respectively mounted on two top ends on two sides of the stand 10'. In a preferred embodiment, the handles 20' both extend to a rear of the stand 10'.

In a preferred embodiment, the transport chair comprises four wheels 30' arranged in a rectangle and mounted on a bottom of the stand 10', wherein two wheels 30' at a front of the stand 10' are mounted on a pivot base. The pivot base is mounted pivotally on a bottom of the stand 10' to allow the front wheels 30' on the pivot base to pivot relative to the stand 10'.

The seat cushion 40' is mounted on the stand 10' and is mounted between the handles 20' and the wheels 30'. In a preferred embodiment, a front side of the seat cushion 40' is pivoted on a side of the stand 10', and a rear side of the seat cushion 40' abuts the other side of the stand 10'.

The foot support 50' is mounted on the stand 10' and under a side of the seat cushion 40'. In a preferred embodiment, the foot support 50' is a curved rod and has a pad 51' mounted on an end of the foot support 50'.

Each one of the at least one braking system 60 is mounted on the stand 10' and corresponds to one of the four wheels 30'. The at least one operating system 70 is mounted on the stand 10' and each one of the at least one operating system 70 corresponds to one of the at least one braking system 60. In conclusion, when the user sits on the seat cushion 40, 40' and rests, the braking systems 60 are kept actuated without requiring the user to press the operating system 70. Accordingly, the rollator and the transport chair would not be slidable when sat on by the user, thereby avoiding danger. In addition, if the user needs to grasp something else by two hands when walking on a slope, the user can just release the present invention. The braking systems 60 automatically actuates so that the present invention does not slide down the slope, thereby avoiding danger.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A braking system comprising:
   a braking part adapted for being mounted adjacent to a wheel of a rollator or a transport chair and having
      a body adapted for being pivotally mounted on a stand of the rollator or the transport chair, being a vertical panel, and having two opposite sides;
      an abutting part connected to one of the two sides of the body and adapted for abutting the wheel; and
      a connecting part connected to the other side of the body;
   a fixed board mounted above the braking part;
   an elastic element having two ends respectively abutting the fixed board and the connecting part to press the braking part;
   an operating system corresponding to and connected to the braking part and adapted for being mounted on the stand of the rollator or the transport chair; and
   wherein when the operating system is unactuated, the braking part tightly abuts a surface of the wheel, and when the operating system is actuated, the braking part departs from the surface of the wheel.

2. The braking system as claimed in claim 1, wherein the operating system comprises:
   an operating part adapted for being mounted on one of two handles of the rollator or the transport chair; and
   a brake line connected to the operating part and comprising:
      a pipe, and ends of the pipe respectively mounted on the operating part and the fixed board of the braking system; and
      a line extending from the ends of the pipe, and ends of the line respectively mounted on the operating part and the connecting part of the braking part.

3. A rollator comprising:
   a stand having two opposite sides;
   two handles respectively mounted on the two sides of the stand;
   at least three wheels mounted rotatably on a bottom of the stand;
   a seat cushion mounted on the stand and mounted between the handles and the wheels;
   at least one braking system mounted on the stand, each one of the at least one braking system corresponding to one of the at least three wheels, mounted adjacent to the corresponding wheel and having
      a braking part mounted on a side of the corresponding wheel and having
         a body pivotally mounted on the stand, being a vertical panel, and having two opposite sides;
         an abutting part connected to one of the two sides of the body and abutting the corresponding wheel; and
         a connecting part connected to the other side of the body;
      a fixed board mounted on the stand above the braking part;
      an elastic element having two ends respectively abutting the fixed board and the connecting part to press the braking part to abut the corresponding wheel;
   at least one operating system mounted on the stand, each one of the at least one operating system corresponding to and connected to one of the at least one braking system;
   wherein when the at least one operating system is unactuated, the braking part tightly abuts a surface of the corresponding wheel, and when the at least one operating system is actuated, the braking part departs from the surface of the corresponding wheel.

4. The rollator as claimed in claim 3, wherein the at least one operating system comprises:
   an operating part mounted on one of the handles; and
   a brake line connected to the operating part and a corresponding braking system, and comprising:
      a pipe, and ends of the pipe respectively mounted on the operating part and the fixed board of the braking system; and
      a line extending from the ends of the pipe, and ends of the line respectively mounted on the operating part and the connecting part of the braking part of the corresponding braking system.

5. The rollator as claimed in claim 3, wherein a surface of the braking part of each one of the at least one braking system abutting the wheel is flat.

6. The rollator as claimed in claim 3, wherein a surface of the braking part of each one of the at least one braking system abutting the wheel is wavy.

7. The rollator as claimed in claim 3, wherein the elastic element is a spring.

8. The rollator as claimed in claim 3 comprising two braking systems and two operating systems respectively connected to the two braking systems.

9. The rollator as claimed in claim 3, wherein the stand is foldable.

10. The rollator as claimed in claim 3 further comprising a seatback mounted on the stand above a side of the seat cushion.

11. A transport chair comprising:
    a stand having two opposite sides;
    two handles respectively mounted on the two sides of the stand;
    four wheels separately mounted rotatably on a bottom of the stand and arranged in a rectangle;
    a seat cushion mounted on the stand and mounted between the handles and the wheels;
    a foot support mounted on the stand and having a pad mounted on an end of the foot support;
    at least one braking system mounted on the stand, each one of the at least one braking system corresponding to one of the wheels, mounted adjacent to the corresponding wheel, and having
       a braking part mounted on a side of the corresponding wheel and having
          a body pivotally mounted on the stand, being a vertical panel, and having two opposite sides;
          an abutting part connected to one of the two sides of the body and abutting the corresponding wheel; and a connecting part connected to the other side of the body;

a fixed board mounted on the stand above the braking part;

an elastic element having two ends respectively abutting the fixed board and the connecting part to press the braking part to abut the corresponding wheel;

at least one operating system mounted on the stand, each one of the at least one operating system corresponding to and connected to one of the at least one braking system;

wherein when the at least one operating system is unactuated, the braking part tightly abuts a surface of the corresponding wheel, and when the at least one operating system is actuated, the braking part departs from the surface of the corresponding wheel.

12. The transport chair as claimed in claim 11, wherein the at least one operating system comprises:

an operating part mounted on one of the handles; and a brake line connected to the operating part and a corresponding braking system, and comprising:

a pipe, and ends of the pipe respectively mounted on the operating part and the fixed board of the braking system; and a line extending from the ends of the pipe, and ends of the line respectively mounted on the operating part and the connecting part of the braking part of the corresponding braking system.

\* \* \* \* \*